United States Patent [19]
Oh

[11] Patent Number: 5,694,185
[45] Date of Patent: Dec. 2, 1997

[54] MATRIX ARRAY OF ACTIVE MATRIX LCD AND MANUFACTURING METHOD THEREOF

[75] Inventor: Young-Jin Oh, Seoul, Rep. of Korea

[73] Assignee: LG Electronics Inc., Seoul, Rep. of Korea

[21] Appl. No.: 639,617

[22] Filed: Apr. 29, 1996

[30] Foreign Application Priority Data

Nov. 25, 1995 [KR] Rep. of Korea ............ 95-43742

[51] Int. Cl.⁶ ........................................ G02F 1/136
[52] U.S. Cl. ........................... 349/46; 349/42; 349/44; 349/47
[58] Field of Search ........................ 349/42, 43, 44, 349/46

[56] References Cited

U.S. PATENT DOCUMENTS

| | | | |
|---|---|---|---|
| 5,003,356 | 3/1991 | Wakai et al. | 349/44 |
| 5,327,001 | 7/1994 | Wakai et al. | 349/44 |
| 5,345,324 | 9/1994 | Koseki et al. | 349/44 |
| 5,459,596 | 10/1995 | Ueda et al. | 349/42 |
| 5,517,341 | 5/1996 | Kim et al. | 349/42 |
| 5,600,461 | 2/1997 | Ueda et al. | 349/38 |

*Primary Examiner*—William L. Sikes
*Assistant Examiner*—Julie Ngo
*Attorney, Agent, or Firm*—Finnegan, Henderson, Farabow, Garrett & Dunner, L.L.P.

[57] ABSTRACT

A matrix array of an active matrix liquid crystal display (AMLCD) and a manufacturing method thereof by which aperture ratio is enhanced by an optimum structure design of a line of the matrix array and a thin film transistor (TFT) so as to reduce power consumption, increase luminance, and lower reflection, thus improving contrast ratio. Aperture ratio is increased by forming the TFT above the gate line and providing non-linear TFT. The parasitic capacitor, occurring between the gate busline and the drain electrode, can be reduced when a TFT having the same channel length is manufactured due to effect of channel length extension. Therefore, level shifts of the pixel voltage can be reduced so that flicker is reduced and video quality is enhanced.

26 Claims, 7 Drawing Sheets

MATRIX ARRAY OF ACTIVE MATRIX LCD AND MANUFACTURING METHOD THEREOF

BACKGROUND OF THE INVENTION

The present invention relates to an active matrix liquid crystal display (AMLCD), in which an aperture ratio is improved by optimizing the design of a busline and thin film transistor (TFT) structures to reduce power consumption, increase luminance, and lower reflection, thereby improving contrast ratio.

A conventional AMLCD includes a large number of pixels and associated switching devices, such as TFTs, arranged in an array. The pixels are interconnected by a plurality of gate buslines, data buslines and pads formed at each end of the gate and data buslines. Each pixel includes a pixel electrode, which is electrically connected to the switching devices for applying voltages corresponding to whether light is to be transmitted or blocked by the pixel. A storage capacitor is also included to improve the pixel's electrical characteristics.

Figure 1:
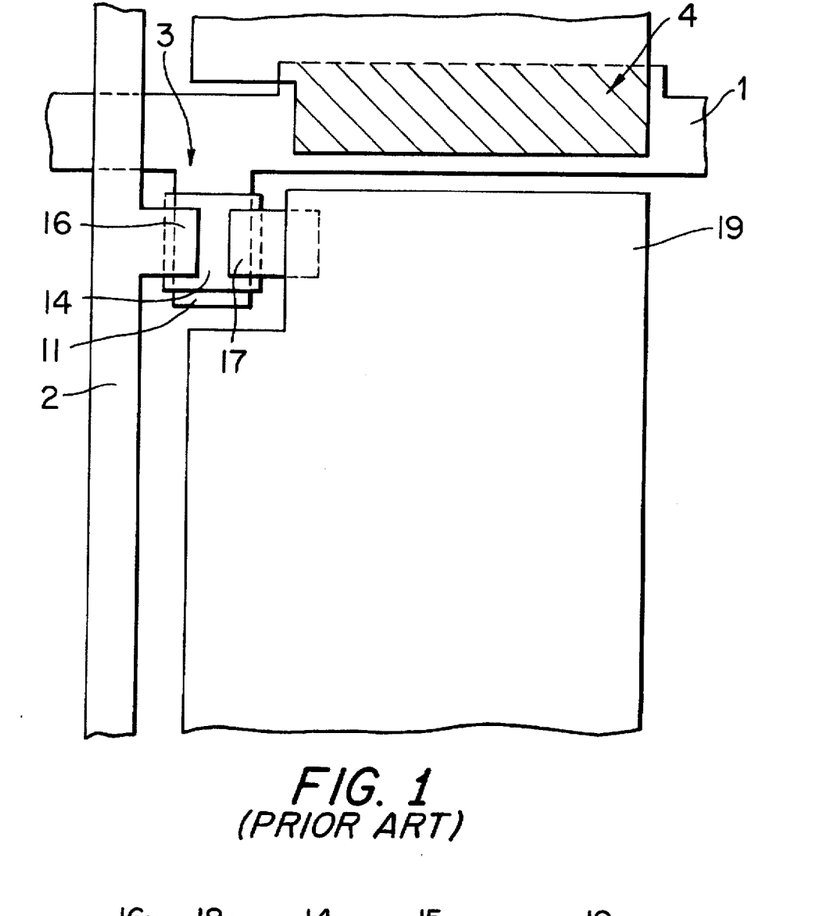
FIG. 1 is a plan view of a conventional matrix array of active matrix liquid crystal display.

As shown in FIG. 1, in the matrix array of an AMLCD, each pixel includes a gate busline 1 and data busline 2, which cross each other; a gate electrode 11 extending from gate busline 1; an amorphous silicon island 14 overlapping gate electrode 11; a source electrode 16 extending from data busline 2; and a TFT 3 including a drain electrode 17 formed corresponding to source electrode 16. As further shown in FIG. 1, a pixel electrode 19 is connected to drain electrode 17. The pixel further includes a storage capacitor 4 having an insulating layer sandwiched between a first capacitor electrode, which is an extension of an adjacent gate bus line 1, and a second storage capacitor electrode, which is a portion of pixel electrode 19 overlapping the first electrode.

Figure 2:
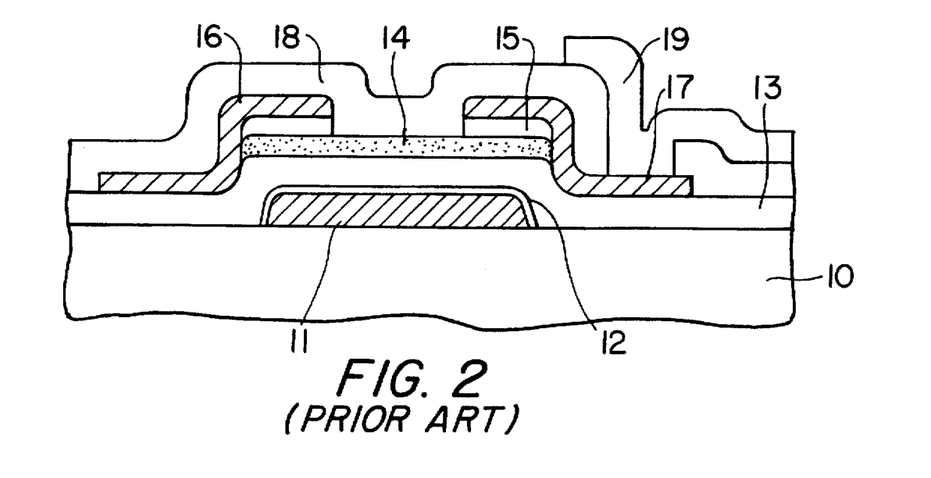
FIG. 2 is a cross-sectional view taken along the line I—I of FIG. 1.

As shown in FIG. 2, in the conventional AMLCD, a protruding portion of the gate bus line serves as the gate electrode 11 of the TFT. Gate electrode 11 is formed on an insulating substrate 10, and a first insulating layer 13 is formed on a exposed surface of insulating substrate 10 and gate electrode 11. As further shown in FIG. 2, an undoped amorphous silicon layer 14 and source/drain doped amorphous silicon layer 15 are then formed successively on insulating layer 13. Source/drain layer 15 does not constitute part of the channel.

A source electrode 16 is then formed on doped amorphous silicon layer 15 partially overlapping gate electrode 11. In addition, a drain electrode 17 is formed partially overlapping gate electrode 11 and symmetrically with source electrode 16. A passivation layer 18 is next formed on source/drain electrodes 16 and 17 for protecting insulating substrate 10, and a pixel electrode 19 is formed connected to drain electrode 17 through a contact hole formed in passivation layer 18. Gate electrode 11 may be formed of a conductive material capable of anodeoxidation so that an oxide insulating layer 12 can be formed on a surface of gate electrode 11.

In order to achieve a high quality video display, the conventional active matrix LCD described above requires a high aperture ratio, which is a ratio of an opening area through which light actually passes to the total pixel area. In general, however, each electrode of the gate busline, data busline, TFT, and storage capacitor is formed of an opaque conductive material. Since the size (width) of the gate busline, data busline, and TFT determine current carrying capacity, and the size of the storage capacitor determines the ability to maintain application of current to the pixel and the ability to reduce flicker effect, there is a limit to how much the opaque area in each pixel can be reduced. Thus, it is difficult to improve the aperture ratio.

Accordingly, forming the TFT on a conventional gate busline has been proposed in order to improve the aperture ratio. Such a TFT includes: a gate electrode, which is a partial area of a linear gate busline, a first insulating layer formed thereon, a semiconductor island layer formed on the first insulating layer, and source/drain electrodes formed on the semiconductor layer facing each other. A protruding portion of the data line serves as the source electrode and partially overlaps the gate electrode, and the drain electrode is connected with a pixel electrode and partially overlaps the gate electrode. Accordingly, the aperture ratio can be improved by using a partial area of the gate busline, but not additionally forming a gate electrode, which is opaque.

However, in the TFT structure of the conventional AMLCD in which the TFT is formed on the gate busline, a parasitic capacitor is created due to a metal-insulator-metal (MIM) structure including the gate busline/insulating layer/source electrode and drain electrode. The parasitic capacitor $C_{gs}$ occurring between the drain and gate lines connected with the pixel electrode, and the size of the capacitance is:

$$C_{gs} = \epsilon \frac{A_{gs}}{d_{gs}} \quad (1)$$

As noted below, $C_{gs}$ is a parameter that determines a level shift $\Delta V_p$ of the pixel voltage generated by dielectric constant anisotropy of the liquid crystal. In expression (1), $\epsilon$ denotes a dielectric constant of a dielectric layer formed between the gate and drain electrodes, i.e., the first insulating layer and an oxide insulating layer; $A_{gs}$ denotes an area where the gate and drain electrodes overlap each other; and $d_{gs}$ denotes distance between the gate and drain electrodes.

The relationship between parasitic capacitor $C_{gs}$ and $\Delta V p$ is as follows:

$$\Delta V_p = V_{sc} - V_{pc} = V_g \frac{C_{gs}}{C_t} \quad (2)$$

In expression (2), voltage $V_{sc}$ denotes a center voltage of a signal voltage; voltage $V_{pc}$ denotes a center voltage of the pixel electrode; voltage $V_g$ denotes voltage of the gate electrode; and the total capacity $C_t = C_{gs} + C_S$ (storage capacitor)+$C_{LC}$ (liquid crystal capacitor).

If $C_{gs}$ is much smaller than $C_S$ or $C_{LC}$ in expression (2), the denominator $C_t$ equals $C_S + C_{LC}$, and will thus be assumed a constant. Accordingly, the magnitude of $\Delta V_p$, the pixel level shift value, is proportional to the size of $C_{gs}$.

$\Delta V_p$ contributes to inferior display images by causing, for example, afterimages, image inconsistency between pixels, and poor reliability of the LCD. Thus, to obtain superior video quality, the size of $\Delta V_p$ should be reduced. According to expression (2), to lower the $\Delta V_p$ value, $C_{gs}$ must also be lowered, which can be accomplished by lowering $\epsilon$ of the first insulating layer or increasing $d_{gs}$. However, changing these parameters can deleteriously alter other electrical characteristics of the device.

SUMMARY OF THE INVENTION

To solve the above problems, it is an object of the present invention to provide a matrix array of an active matrix liquid crystal display having thin film transistors, which are formed on a gate line to provide a high aperture ratio, thereby solving problems associated with the parasitic capacitance $C_{gs}$.

Accordingly, to achieve the above object, there is provided a matrix array of an active matrix liquid crystal display comprising: an insulating substrate: a gate line, on the insulating substrate, having a plurality of first regions which are gate electrodes and a plurality of second regions connected to and adjacent the first regions; a first insulating layer formed on the gate line and an exposed surface of the insulating substrate; a semiconductor layer of an island-shape formed on the first insulating layer to overlap the first region of the gate line; a data line, on the semiconductor layer, having a protruding portion in a gate line forming direction above the first region of the gate line and crossing the first region of the gate line; a source electrode, which is the protruding portion of the data line and a part of the data line at one side thereof; a plurality of thin film transistors including a drain electrode formed on the semiconductor layer to correspond with the source electrode; a pixel electrode connected with the drain electrode; and a plurality of storage capacitors adopting a part of a second region of the gate line as a first storage capacitor electrode.

To further achieve the above object, there is provided a manufacturing method for a matrix array of an active matrix liquid crystal display including a thin film transistor, the method comprising the steps of: forming a gate line on an insulating substrate; forming a first insulating layer on an exposed surface of the insulating substrate and said gate line; depositing a hydrogenated amorphous silicon layer and a doped amorphous silicon layer on the first insulating layer, and then, removing the deposited resultant, exclusive of a channel-forming portion on the gate line and a storage-capacitor-forming portion; depositing metal for forming source/drain electrodes on the doped amorphous silicon layer and an exposed surface of the first insulating layer, and forming a second storage capacitor electrode on a data line having a protruding portion in parallel with the gate line and crossing the gate busline, a drain electrode partially overlapping the data line protruding portion and the gate line and maintaining the same distance with one side of the protruding portion, and a doped amorphous silicon layer of the storage capacitor; and removing the doped amorphous silicon layer using as a mask the drain electrode, the data line, and the protruding portion of the data line.

BRIEF DESCRIPTION OF THE DRAWINGS

The above objects and advantages of the present invention will become more apparent by describing in detail a preferred embodiment thereof with reference to the attached drawings, in which.

DETAILED DESCRIPTION OF THE INVENTION

Figure 3:
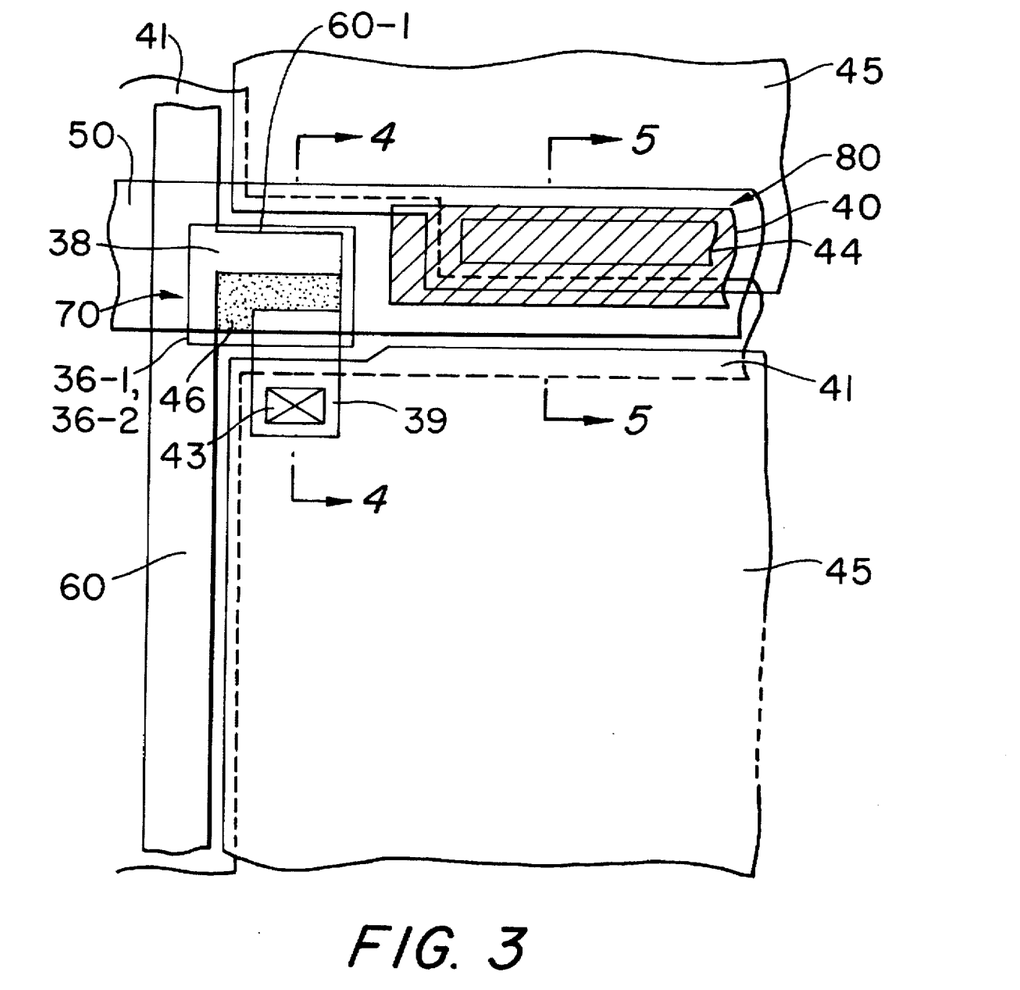
FIG. 3 is a plan view of an embodiment of a matrix array of active matrix liquid crystal display according to the present invention.

FIG. 3 shows a single pixel of a matrix array of an AMLCD in accordance with an embodiment of the present invention. A linear gate line 50 is provided on an insulating substrate, and a data line 60 is provided crossing gate line 50. Data busline 60 has a protruding portion 60-1 extending in the same direction as gate line 50.

A drain electrode 39 is formed in corresponding relationship to a source electrode 38, which includes protruding portion 60-1 at one side of data line 60. Drain electrode 39 is connected to an upper portion of pixel electrode 45 through a contact hole 43. Here, drain electrode 39 overlaps part of gate line 50 and is formed in equally spaced relation to protruding portion 60-1 and to data line 60. Adjacent data line 60, protruding portion 60-1, and the lower portion of drain electrode 39, an amorphous silicon island-shaped layer 36-1 and 36-2 is formed so that a channel region 46 of TFT 70 is formed at an angle about the drain electrode and is non-linear or L-shaped. In particular, current flows from a portion of data line 60 adjacent protruding portion 60-1 as well as the protruding portion 60-1 itself. Thus, since the channel length can be increased, it is possible to reduce the physical size of the source electrode while maintaining the same level of current flow as in the conventional TFT. Therefore, since the source electrode can be made physically smaller in accordance with the present invention, the amount of source-gate electrode overlap and thus the resulting capacitance $C_{gs}$ can also be reduced.

As further shown in FIG. 3, capacitor 80 is formed on the next gate line 50. At a lower portion of the pixel, gate line 50, which provides a first storage capacitor electrode, and a second storage capacitor electrode 40 are formed between a first insulating layer, amorphous silicon layer 36-1 and a doped amorphous silicon layer 36-2. Second storage capacitor electrode 40 is covered with a passivation layer and connected with pixel electrode 45 through contact hole 44 formed on the passivation layer.

Also, the embodiment shown in FIG. 3 includes a substantially opaque layer, for example a black matrix (B/M) layer 41, provided on the lower substrate. As further shown in FIG. 3, data line 60, a part of gate line 50, and a part of pixel electrode 45 overlap one another.

FIGS. 4A–4G and 5A–5G show steps of a matrix array manufacturing method of an AMLCD in accordance with an embodiment of the present invention; FIGS. 4A–4G are progressive sectional views taken along line 4—4 of FIG. 3 and FIGS. 5A–5G are progressive sectional views taken along line 5—5 of FIG. 3.

Figure 4A:
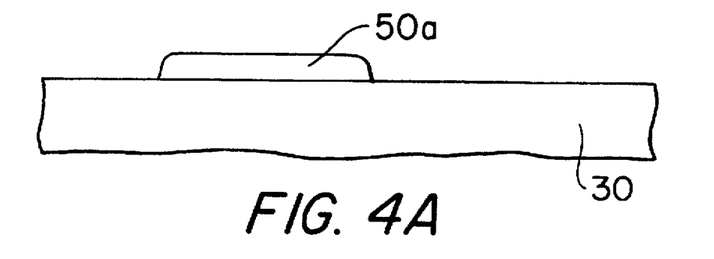
FIGS. 4A–4G and 5A–5G are cross-sectional views taken along lines 4—4 and 5—5, respectively, of FIG. 3, illustrating a manufacturing process of the present invention.
Figure 5A:
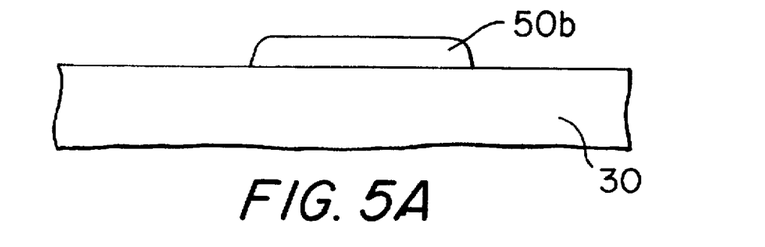

First, as shown in FIGS. 4A and 5A, a first conductive material layer is formed on a transparent substrate 30 using a sputtering apparatus. The conductive material is then patterned to form gate electrode 50-a which is part of the gate line and a first storage capacitor electrode 50-b. The first metal material, can be selected from the group including aluminum (Al), aluminum alloy, molybdenum (Mo), molybdenum alloy, or any other anodeoxidizable metal.

Figure 4B:
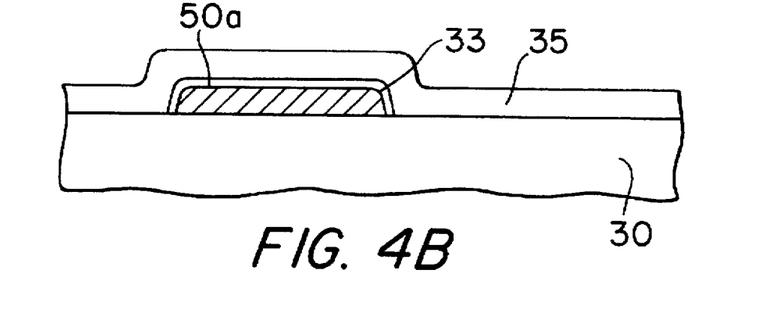
Figure 5B:
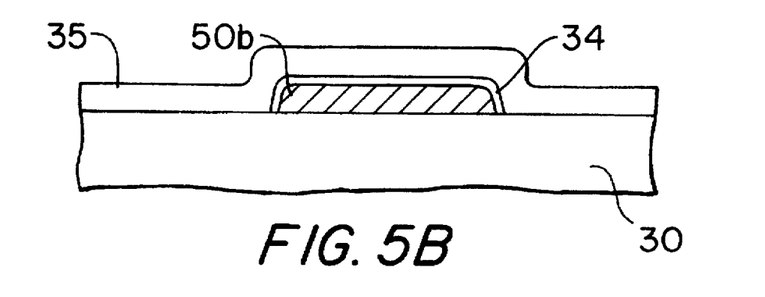

Next, as shown in FIGS. 4B and 5B, by anode-oxidizing gate electrode 50-a and first storage capacitor electrode 50-b, oxide insulating layers 33 and 34 are formed. Then, a single or double insulating layer 35 is formed by providing a silicon oxide layer or a silicon nitride layer on exposed surfaces of oxide insulating layers 33 and 34 and insulating substrate 30.

Figure 4C:
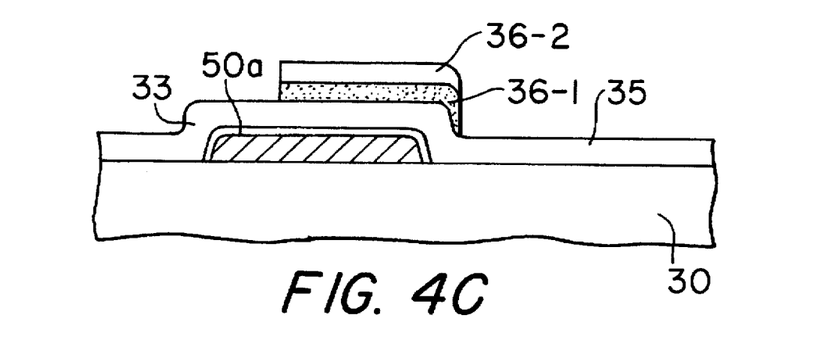
Figure 4D:
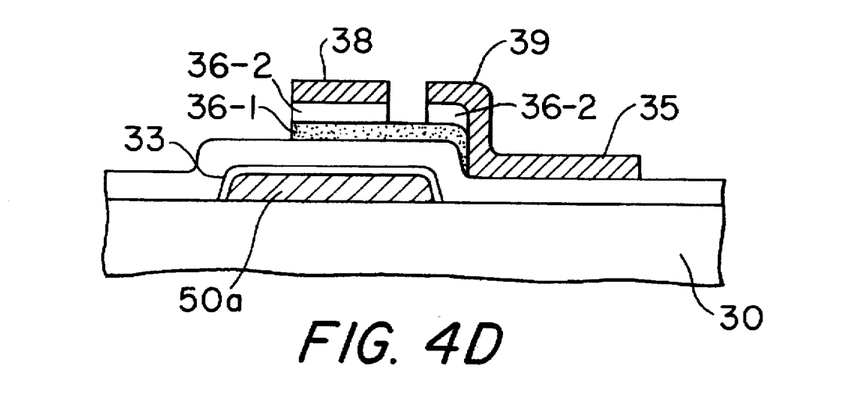
Figure 5C:
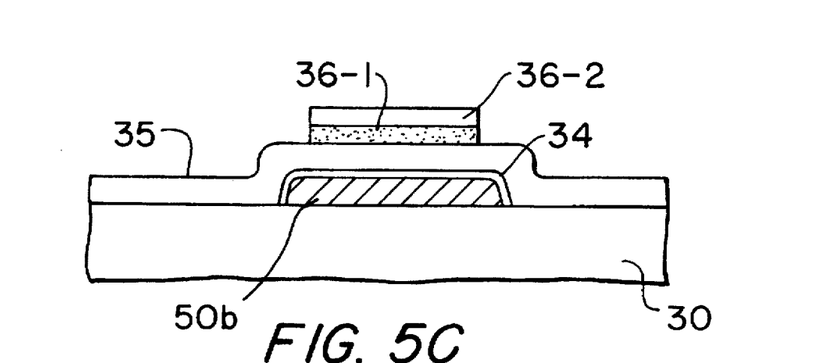
Figure 5D:
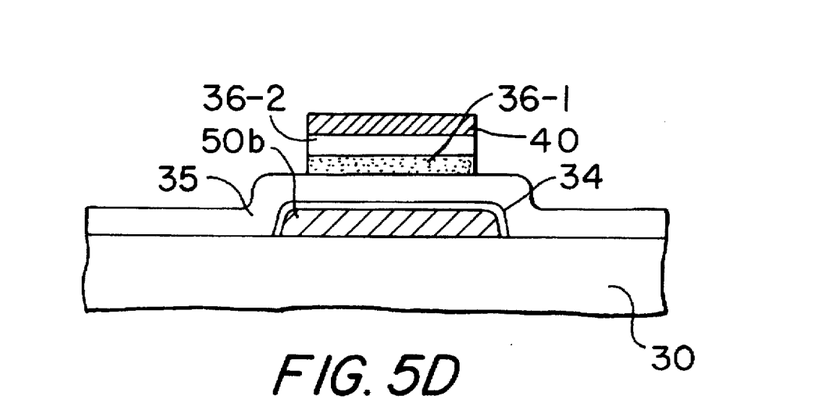

Then, as shown in FIGS. 4C and 5C, hydrogenated amorphous silicon (a-Si:H) and doped amorphous silicon n+a-Si:H are successively deposited on the first insulating layer. These amorphous silicon layers are then patterned in an etching process to form hydrogenated amorphous silicon layer 36-1 and doped amorphous silicon layer 36-2 overlapping the upper portions of gate electrode 50-a of the TFT and storage capacitor electrode 50-b. Next, as shown in FIGS. 4D and 5D, a second conductive material is deposited over hydrogenated amorphous silicon layer 36-1, doped amorphous silicon layer 36-2, and first insulating layer 35, and then, patterned to form a data line 60 having a protruding portion, drain electrode 39, second storage capacitor electrode 40 and source electrode 38. Selected portions of source/drain electrodes 38 and 39 and doped amorphous silicon layer 36-2 are then removed using a mask. After this step, the source electrode 38 is provided in a portion defined by the protruding portion 60-1 (FIG. 3) of data line 60, which are preferably angled, preferably L-shaped, so that drain electrode 39 is correspondingly angled in a non-linear shape, preferably perpendicular, above hydrogenated amorphous silicon layer 36-1 and doped amorphous silicon layer 36-2. Accordingly, an angled channel area 46 can be obtained.

Figure 4E:
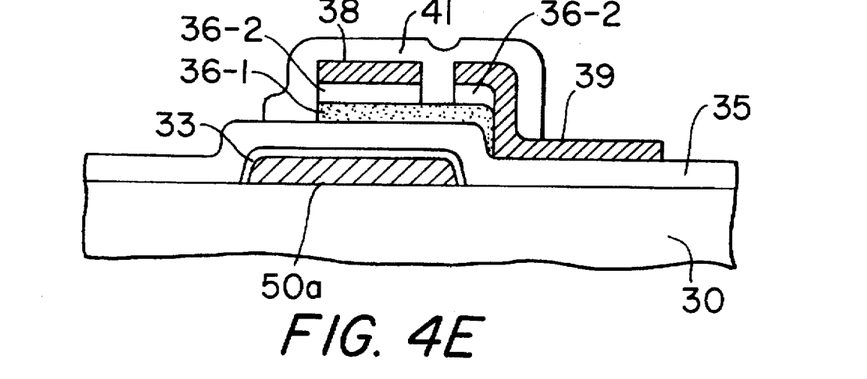
Figure 5E:
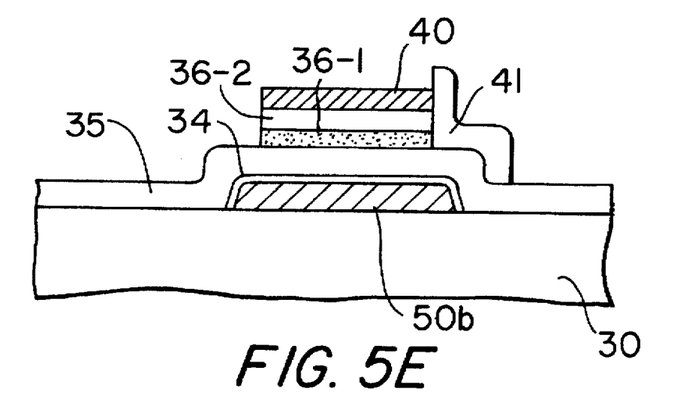

Then, as shown in FIGS. 4E and 5E, a black resin, which is preferably a substantially opaque insulating material, is deposited on the entire exposed surface, and then patterned so that a black matrix 41 is formed over areas, such as source electrode 38, a part of drain electrode, and the upper portion of gate electrode 31, to be shielded from light. Also, black matrix 41 is formed to cover a part of second storage capacitor electrode 40 of the storage capacitor. Accordingly, when viewing the entire array, black matrix 41 covers the gate line and data busline, except part of the storage capacitor.

Figure 4F:
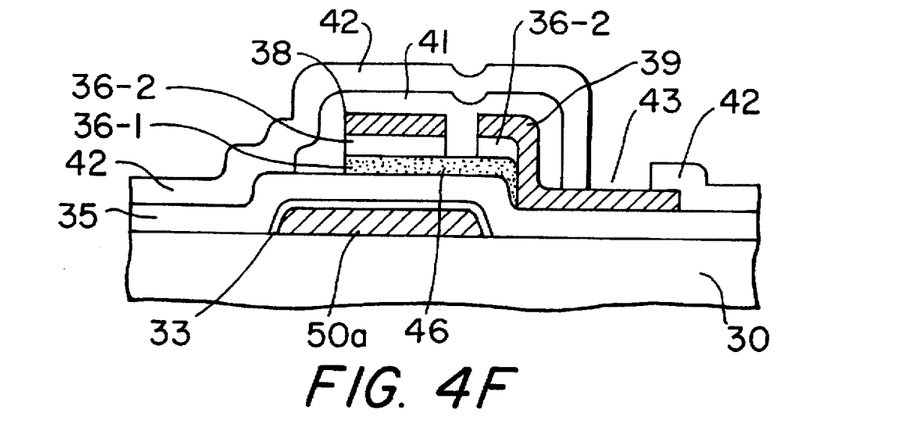
Figure 5F:
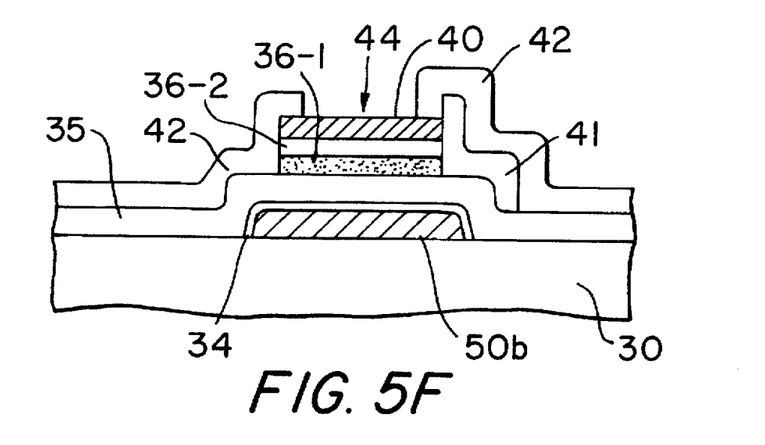

Next, as shown in FIGS. 4F and 5F, passivation layer 42, preferably including silicon oxide and silicon nitride layers, is formed on exposed surfaces of black matrix 41 and first insulating layer 35 by sputtering or chemical vapor deposition (CVD). Then, contact holes 43 and 44 are formed by dry-etching passivation layer 42 to expose drain electrode 39 of TFT 70 and a part of second storage capacitor electrode 40 of the storage capacitor.

Figure 4G:
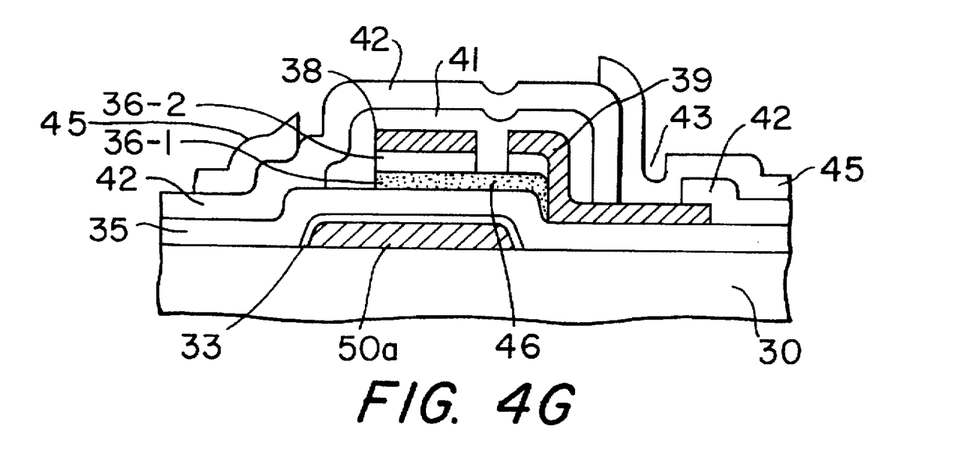
Figure 5G:
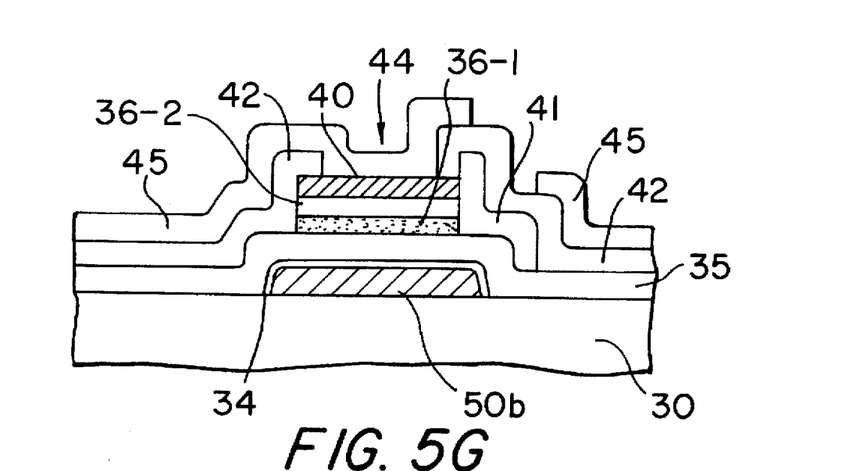

Then, as shown in FIGS. 4G and 5G, passivation layer 42, is formed on substrate including the upper portion of black matrix 41 and the storage capacitor. Portions of passivation layer 42 are then removed to expose part of the second storage capacitor electrode 40 and insulating layer 35. A transparent conductive material, preferably ITO is then deposited, and subsequently patterned as shown in FIGS. 4G and 5G to form pixel electrode 45 in contact with source electrode 39 through contact hole 43. As further shown in FIG. 5G, pixel electrode 45 also contacts second storage capacitor electrode 40 of the storage capacitor through contact hole 44.

Figure 6:
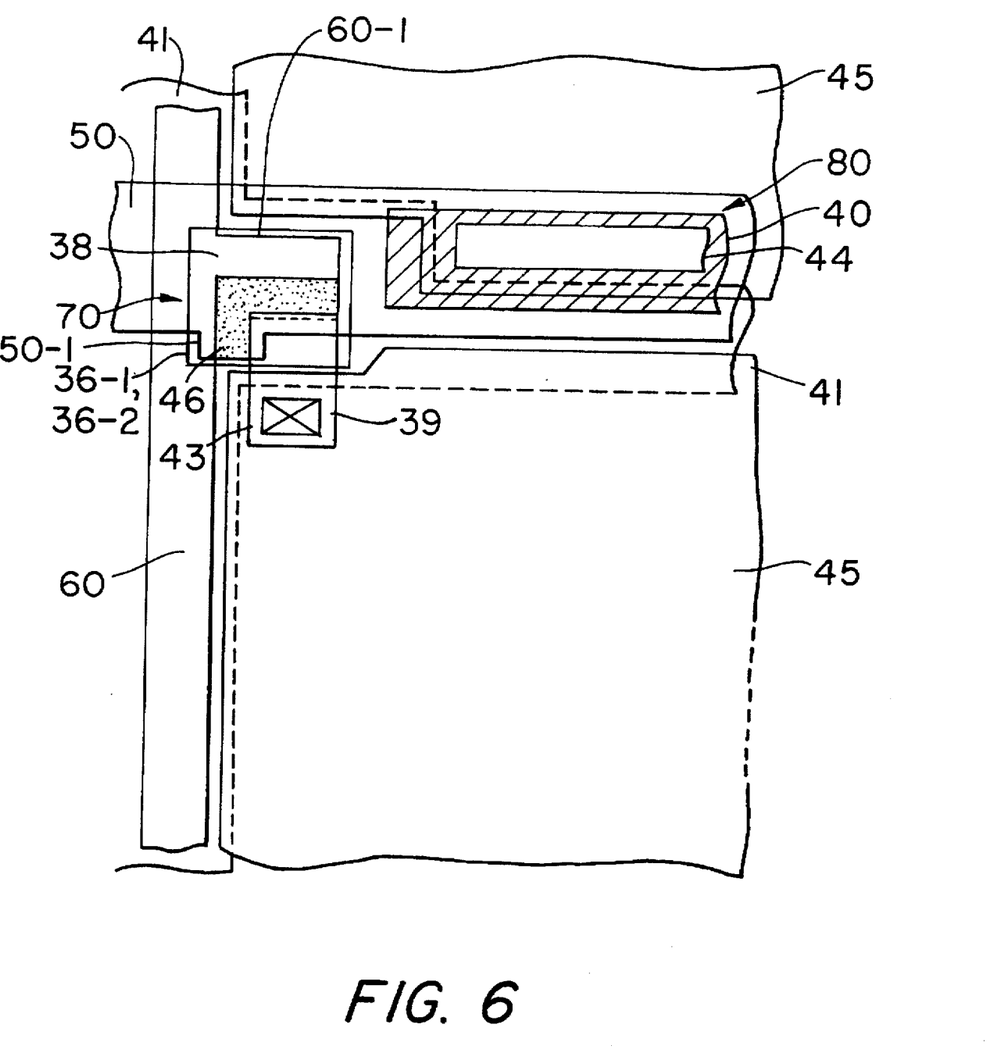
FIG. 6 is a plan view of another embodiment of a matrix array of an active matrix liquid crystal display according to the present invention.

FIG. 6 shows another embodiment of the present invention in which a protruding portion 50-1 extends from gate line 50 and partially overlaps data line 60 adjacent protruding portion 60-1. Since the basic structure of the embodiment shown in FIG. 6 is similar to the embodiment shown in FIG. 3, further description of the structure common to both the first and second embodiments will be omitted.

In fabricating the device shown in FIG. 6, protruding portion 50-1 can be patterned along with gate electrode 50-a and first storage capacitor electrode 50-b, i.e., gate line 50. The process for fabricating the device shown in FIG. 6 then continues according to the steps shown in FIGS. 4B–4G and 5B–5G.

As described above, in the matrix array of an AMLCD of the present invention, aperture ratio increases by forming the TFT above the gate busline and providing a nonlinear channel area. Thus, the parasitic capacitor present between the gate busline and the source electrode can be reduced because the TFT has a longer channel length. Therefore, $\Delta V_p$, the shift level value of the pixel voltage, can be reduced so that flicker is also reduced and video quality is improved.

What is claimed is:

1. A matrix array of an active matrix liquid crystal display comprising:

an insulating substrate;

a gate line extending in a first direction on said substrate and having a first region corresponding to a gate electrode and a second region connected to and adjacent said first region, said first and second regions being separate portions of said gate line, and said gate line exposing a portion of said substrate;

a first insulating layer formed on said line and on said exposed portion of said substrate;

a first semiconductor layer formed above and in overlapping relation with said gate line;

a data line provided on said substrate and extending in a second direction crossing said second region of said gate line on said semiconductor layer and having a first protruding portion extending in said first direction above said first region of said gate line, and a second portion contiguous with said first portion, said second direction perpendicular to said first direction, said first and second portions being separate portions of said data line, and said first and second portions of said data line overlying said gate line;

a source electrode including said protruding portion of said data line;

a thin film transistor provided on said substrate including a drain electrode formed on the opposite side of said source electrode;

a pixel electrode coupled to said drain electrode and overlying said second region of said gate line; and a storage capacitor including a portion of the second region of said gate line as a first storage capacitor electrode.

2. A matrix array of an active matrix liquid crystal display comprising according to claim 1, further comprising a substantially opaque layer partially lapping with said pixel electrode and provided above said gate line, said data line, said source electrode, and said drain electrode.

3. A matrix array of an active matrix liquid crystal display according to claim 1, further comprising a substantially opaque layer, wherein said substantially opaque layer overlaps a portion of said first storage capacitor electrode.

4. A matrix array of an active matrix liquid crystal display according to claim 3, wherein said storage capacitor comprises:

an electrode insulating layer formed on the exposed portion of said insulating substrate and said first storage capacitor electrode;

a second semiconductor layer formed on a portion of said electrode insulating layer, said second semiconductor layer being uncovered by said substantially opaque layer;

a second storage capacitor electrode formed on said second semiconductor layer; and a passivation layer formed on said electrode insulating layer and said second storage capacitor electrode, wherein said substantially opaque layer has an exposed surface underlying said passivation layer to accommodate connection of said pixel electrode to said second storage capacitor electrode.

5. The matrix array of an active liquid crystal display according to claim 1, wherein said gate line is linear and has a substantially uniform width.

6. The matrix array of an active matrix liquid crystal display comprising according to claim 1, wherein said gate line has a protruding portion overlapping one side of said source electrode and partially overlapping said drain electrode.

7. The matrix array of an active matrix liquid crystal display comprising according to claim 1, wherein said source electrode and said drain electrode define a non-linear channel region of said thin film transistor.

8. The matrix array of an active matrix liquid crystal display according to claim 1, wherein said source electrode defines a non-linear channel region with said drain electrode above said gate line.

9. The matrix array of an active matrix liquid crystal display according to claim 1, wherein said semiconductor layer includes
an amorphous silicon layer; and
a doped amorphous silicon layer.

10. A liquid crystal display comprising:
a gate line extending in a first direction;
a data line extending in a second direction different than said first direction, said second direction perpendicular to said first direction, and said data line having a protruding first portion extending in said first direction, and a second portion adjacent said first portion and extending in said second direction, wherein said first and second portions of said data line are contiguous and separate portions of said data line, and wherein said first and second portions overlying said gate line;
a source electrode including said first portion of said data line; and
a drain electrode spaced from said first and second portions of said data line and from said source electrode, wherein, upon application of a voltage to said gate line, a current flows from said first and second portions of said data line to said drain electrode.

11. A liquid crystal display device in accordance with claim 10, wherein said second portion of said data line is contiguous with said first portion of said data line.

12. A liquid crystal display device in accordance with claim 11, further comprising a substrate, wherein said gate line and data line are provided on said substrate, and said first and second portions of said data line define a region of said substrate, said source electrode overlying said region of said substrate.

13. A liquid crystal display device in accordance with claim 10, wherein said first and second directions are substantially perpendicular to each other.

14. A liquid crystal display device in accordance with claim 10, further comprising a substantially opaque layer overlying said first and second portions of said data line.

15. A liquid crystal display device in accordance with claim 14, further comprising:
a pixel electrode coupled to said drain electrode, a portion of said pixel electrode is formed on said substantially opaque layer.

16. A liquid crystal display device in accordance with claim 10, further comprising:
a substantially opaque layer overlying a first region of said gate line including a portion beneath said first and second portions of said data line, said substantially opaque layer exposing a second region of said gate line; and
a storage capacitor, said second region of said gate line serving as an electrode of said storage capacitor.

17. A liquid crystal display device in accordance with claim 16, further comprising a pixel electrode, a portion of which overlaps said second region of said gate line and serves as another electrode of said storage capacitor.

18. A liquid crystal display comprising:
a gate line having a first portion extending in a first direction and a second portion extending in a second direction different than said first direction;
a data line extending in said second direction, said data line having a protruding first portion extending in said first direction, and a second portion adjacent said first portion and extending in said second direction, said first portion of said data line overlying said first portion of said gate line, and said second portion of said data line overlying said second portion of said gate line;
a source electrode including said first portion of said data line; and
a drain electrode spaced from said first and second portions of said data line and from said source electrode, wherein, upon application of a voltage to said gate line, a current flows from said first and second portions of said data line to said drain electrode.

19. A liquid crystal display device in accordance with claim 18, wherein said first and second directions are substantially perpendicular to each other.

20. The liquid crystal display device in accordance with claim 18, wherein said first and second portions are contiguous and separate portions of said data line.

21. A liquid crystal display device in accordance with claim 18, further comprising a substrate, wherein said gate line and data line are provided on said substrate, and said first and second portions of said data line define a region of said substrate, said source electrode overlying said region of said substrate.

22. A method of fabricating a liquid crystal display device comprising the steps of:
providing a first conductive layer on a surface of a substrate;
patterning said first conductive layer on said surface of said substrate, said patterned first conductive layer exposing a portion of said surface of said substrate, and extending in a first direction on said surface of said substrate;
forming an insulative layer on said first conductive layer and said exposed portion of said surface of said substrate;
forming a semiconductor layer on said insulative layer, said semiconductor layer having an amorphous silicon layer and a doped amorphous silicon layer;
patterning said semiconductor layer to overlap said portion of said surface of said substrate and said first conductive layer;
forming a second conductive layer on substrate; and
patterning said second conductive layer to form:
a data line over a portion of said semiconductor layer overlying said first conductive layer, and extending in a second direction different than said first direction, said data line having a protruding portion over said portion of said semiconductor layer overlying said first conductive layer and extending in said first direction; and a source electrode overlying said exposed portion of said surface of said substrate, said source electrode being spaced from said protruding portion and a part of said data line contiguous with said protruding portion such that upon application of a voltage to said data line contiguous with protruding portion and from said protruding portion to said source electrode.

23. A method of fabricating a liquid crystal display device in accordance with claim 22, further comprising the steps of:

forming a transparent conductive layer overlying part of said exposed portion of said surface of said substrate; and patterning said transparent conductive layer to form a pixel electrode in contact with said source electrode.

24. A method of fabricating a liquid crystal display device in accordance with claim 22, further comprising the step of:

forming a substantially opaque layer overlying said semiconductor layer.

25. A method of fabricating a liquid crystal display device in accordance with claim 22, wherein said first direction is substantially perpendicular to said second direction.

26. The method of fabricating a liquid crystal display device in accordance with claim 22, further including the step of forming an oxide layer covering said patterned first conductive layer.

* * * * *

UNITED STATES PATENT AND TRADEMARK OFFICE
CERTIFICATE OF CORRECTION

PATENT NO. : 5,694,185  
DATED : December 2, 1997  
INVENTOR(S) : Young-Jin OH

Page 1 of 6

It is certified that error appears in the above-identified patent and that said Letters Patent is hereby corrected as shown below:

In the Drawings, delete Sheet 3 of 7 in its entirety and insert -- --.

UNITED STATES PATENT AND TRADEMARK OFFICE
CERTIFICATE OF CORRECTION

PATENT NO. : 5,694,185
DATED : December 2, 1997
INVENTOR(S) : Young-Jin OH

It is certified that error appears in the above-identified patent and that said Letters Patent is hereby corrected as shown below:

In the Drawings, delete Sheet 4 of 7 in its entirety and insert — —.

UNITED STATES PATENT AND TRADEMARK OFFICE
CERTIFICATE OF CORRECTION

| | | |
|---|---|---|
| PATENT NO. : | 5,694,185 | Page 3 of 6 |
| DATED : | December 2, 1997 | |
| INVENTOR(S) : | Young-Jin OH | |

It is certified that error appears in the above-identified patent and that said Letters Patent is hereby corrected as shown below:

In the Drawings, delete Sheet 5 of 7 in its entirety and insert -- --.

UNITED STATES PATENT AND TRADEMARK OFFICE
CERTIFICATE OF CORRECTION

PATENT NO. : 5,694,185
DATED : December 2, 1997
INVENTOR(S) : Young-Jin OH

It is certified that error appears in the above-identified patent and that said Letters Patent is hereby corrected as shown below:

In the Drawings, delete Sheet 6 of 7 in its entirety and insert —    —.

UNITED STATES PATENT AND TRADEMARK OFFICE
CERTIFICATE OF CORRECTION

PATENT NO. : 5,694,185                 Page 5 of 6
DATED       : December 2, 1997
INVENTOR(S) : Young-Jin OH It is certified that error appears in the above-identified patent and that said Letters Patent is hereby corrected as shown below:

In the Drawings, delete Sheet 7 of 7 in its entirety and insert    --

FIG. 6

--.

UNITED STATES PATENT AND TRADEMARK OFFICE
CERTIFICATE OF CORRECTION

PATENT NO. : 5,694,185
DATED : December 2, 1997
INVENTOR(S) : Young-Jin OH

It is certified that error appears in the above-identified patent and that said Letters Patent is hereby corrected as shown below:

On the Title Page, Item [56], in References Cited, insert
--5,235,448  8/1993   Suzuki et al. .........359/69
  5,007,716  4/1991   Hanyu et al. ..........350/336
  4,850,675  7/1989   Hatanaka et al. .......350/331
  4,840,460  6/1989   Bernot et al. .........350/336
  4,778,560  10/1988  Takeda et al. .........156/643--.

On the Title Page, Item [57], in the Abstract, line 9, "gate busline" should read --gate line--.
Column 5, line 45, "source" should read --drain--.

Signed and Sealed this

Sixth Day of October, 1998

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO.   : 5,694,185
DATED        : December 2, 1997
INVENTOR(S)  : Young-Jin Oh It is certified that error appears in the above-identified patent and that said Letters Patent is hereby corrected as shown below:

Claim 22, Column 9, line 1, "source" should read --drain--
Column 9, line 2, "source" should read -- drain --
Column 9, line 7, "source" should read -- drain --
Claim 23, Column 9, line 14, "source" should read -- drain --.

Signed and Sealed this

Sixth Day of July, 1999

Attest:

Q. TODD DICKINSON

*Attesting Officer*          *Acting Commissioner of Patents and Trademarks*